United States Patent [19]
Bloisi

[11] 3,950,618
[45] Apr. 13, 1976

[54] SYSTEM FOR PUBLIC OPINION RESEARCH

[76] Inventor: Albertoni de Lemos Bloisi, Rua Batatais 333, Sao Paulo, Brazil

[22] Filed: Dec. 27, 1972

[21] Appl. No.: 318,851

Related U.S. Application Data

[63] Continuation-in-part of Ser. No. 170,003, Aug. 9, 1971, abandoned.

[30] Foreign Application Priority Data

Mar. 25, 1971  Germany............................ 2114604

[52] U.S. Cl............. 179/2 AS; 179/2 AS; 178/66 R; 329/106
[51] Int. Cl.²........................................ H04M 11/00
[58] Field of Search...... 179/2 AS, 2 R, 5 R, 84 VF, 179/2 DP

[56] References Cited
UNITED STATES PATENTS

| | | | |
|---|---|---|---|
| 2,398,755 | 4/1946 | Shepherd........................... | 179/2 DP |
| 3,070,798 | 12/1962 | Currey................................ | 179/2 AS |
| 3,335,227 | 8/1967 | Jackel................................. | 179/2 A |
| 3,387,091 | 6/1968 | Deiker................................ | 179/5. R |
| 3,400,378 | 9/1968 | Smith................................. | 179/2 DP |
| 3,598,917 | 8/1971 | De Raedt............................ | 179/5 R |
| 3,699,254 | 10/1972 | Nailen................................ | 178/66 R |
| 3,754,215 | 8/1973 | Blomenkamp...................... | 329/106 |

*Primary Examiner*—Ralph D. Blakeslee
*Attorney, Agent, or Firm*—Michael S. Striker

[57] ABSTRACT

An AC burst having a length depending upon the response chosen by the participant is put on a telephone line regardless of the operating state thereof, at a frequency outside of the telephone band. At the central telephone station the bursts are decoded and response signals corresponding to each answer are summed. The resulting totals are transmitted via private lines to a central computing station where the totals corresponding to a given answer are again added. For television channel polling, a control signal signifying an operative television receiver is also put on the telephone line and, at the central computing station computer circuits compute the percentage of television sets tuned to any given channel.

29 Claims, 15 Drawing Figures

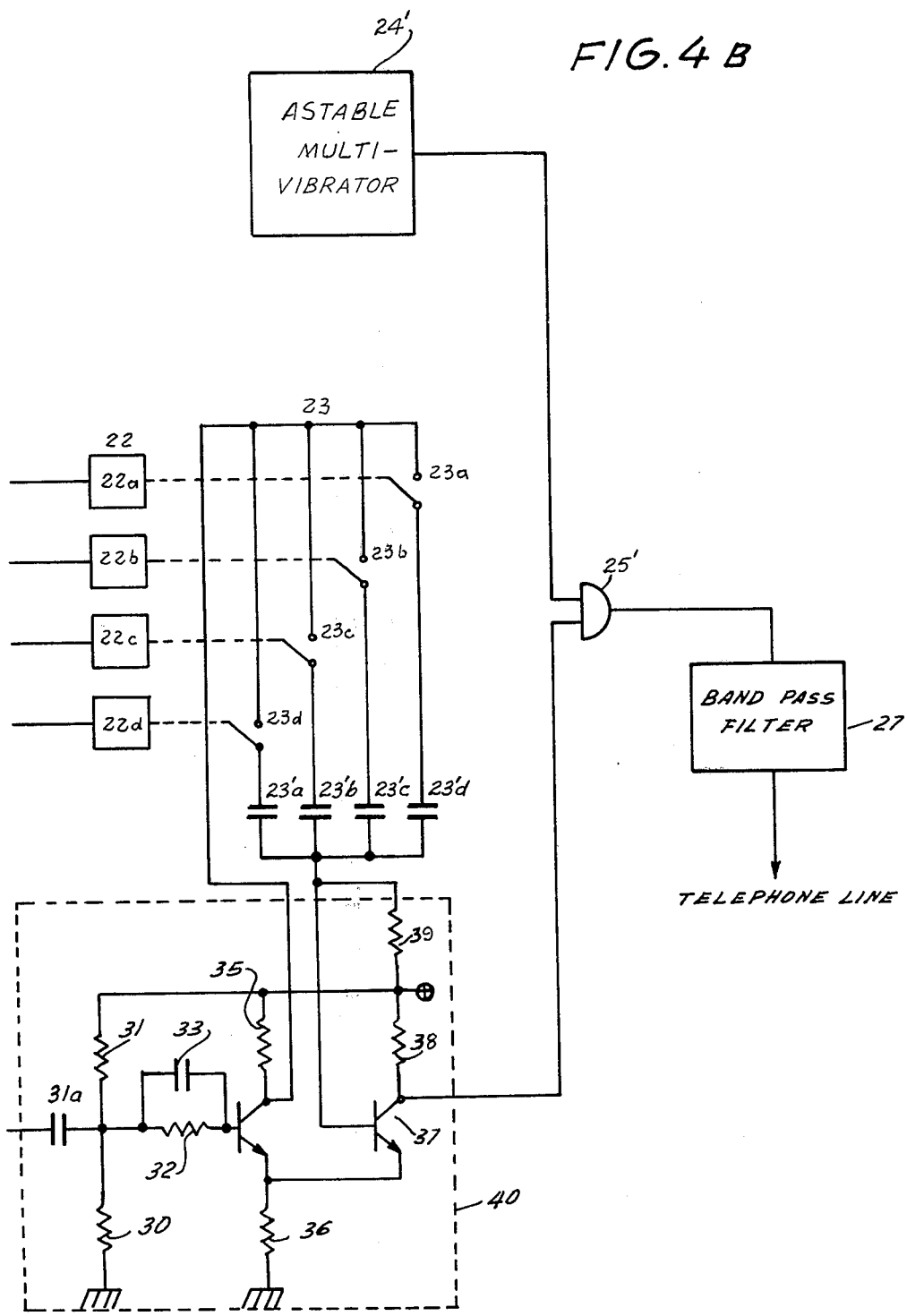

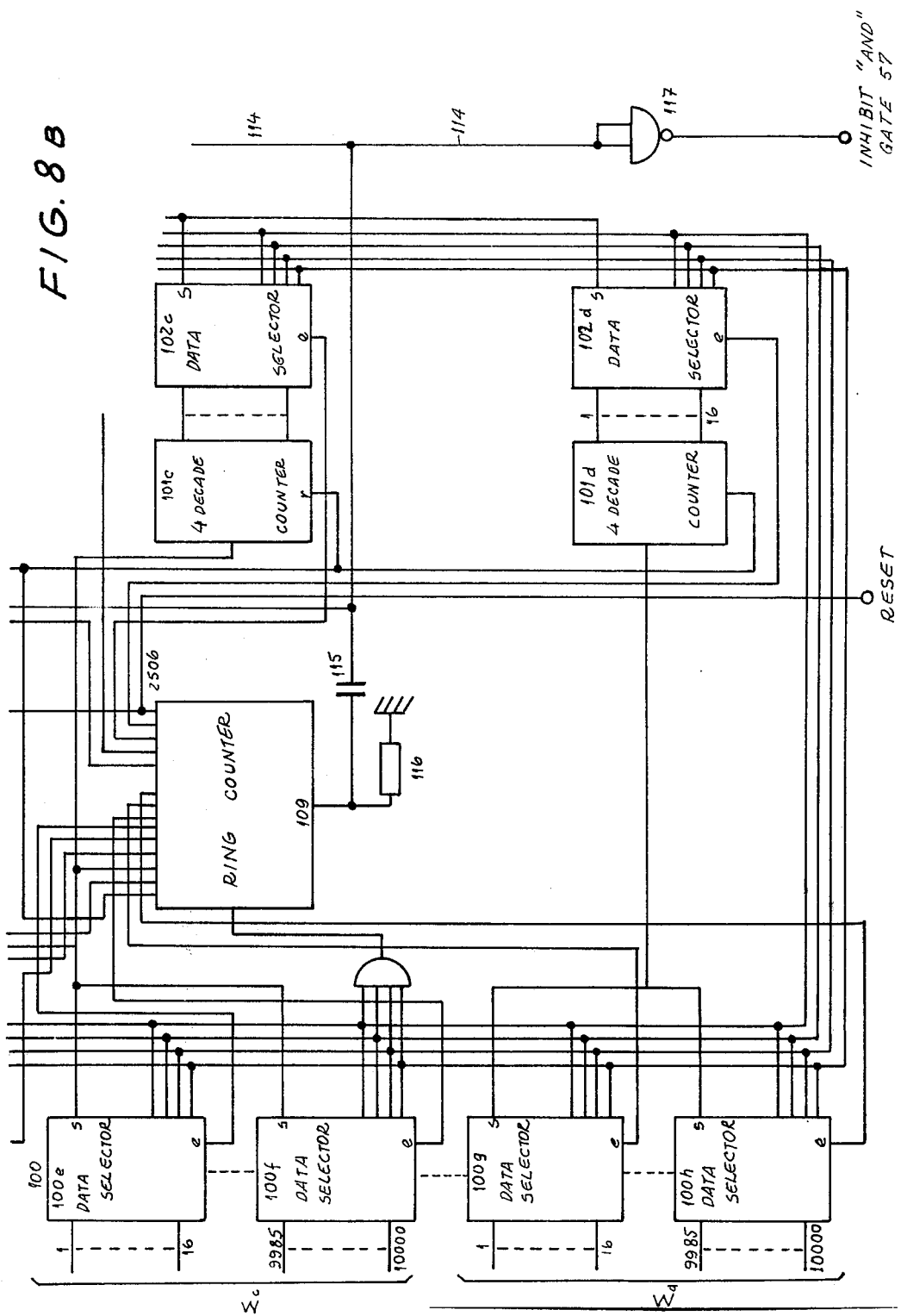

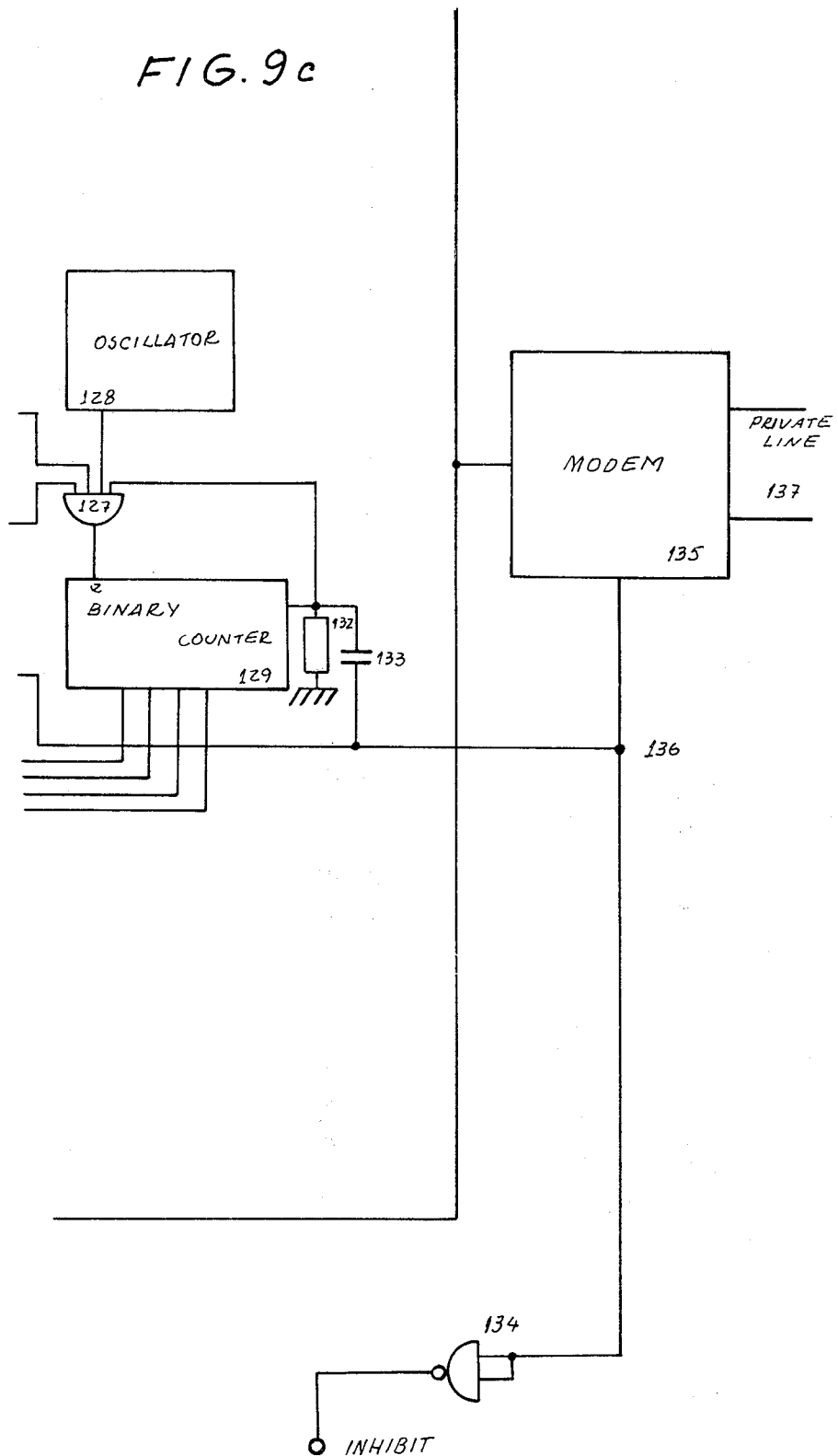

SYSTEM FOR PUBLIC OPINION RESEARCH

CROSS-REFERENCE TO RELATED APPLICATIONS:

This application is a continuation-in-part application of my application Ser. No. 170,003, filed Aug. 9, 1971, now abandoned.

BACKGROUND OF THE INVENTION:

The present invention relates to public opinion research systems based on signals transmitted through a communications network, and in particular the telephone network.

Conventionally, public opinion research is carried out either by personal interviews of a selected group of people, or through the distribution of written questionairs or by telephone calls. Further, radio or television listeners may be asked by telephone to answer some questions. However this method is very complex and requires a long time for processing and does not yield immediate and reliable results. Still another problem results from the fact that a telephone system allows only a small quantity of calls at the same time, thereby reducing the possibility of getting a representative sample in a short time. Further, the results obtained are of course subject to human error.

SUMMARY OF THE INVENTION:

It is an object of the present invention to provide an automatic system for processing a public opinion poll. Specifically, it is desired to provide such a system using existing telephone or other communication lines. The operation of the communication line in conjunction with the equipment of the present invention is to be independent of the state of operation of the line for its intended use. Thus, when a telephone line is used, the operation of the present system is to be independent of the operation of the telephone equipment.

It is another object of the present invention that the system be completely automatic, obviating the need for operators.

It is another objective of the present invention that the total time spent on a poll be less than fifteen minutes.

The present invention is a public opinion research system for polling a plurality of participants having access to a communications network transmitting signals having a predetermined range of values of a predetermined electrical characteristic. The system comprises selectively operable input means, one for each of said participants, for furnishing, upon operation, an input signal signifying a selected one of a plurality of predetermined responses. The input signals have values of said electrical characteristic which are outside of said predetermined range of values. The system further comprises connecting means connecting each of said input means to said communications network in such a manner that each of said input signals is transmitted to a central station of said communications network thereby furnishing response signals at said central station, each of said response signals signifying one of said predetermined responses. Further, summing circuit means are provided at said central station for summing all response signals signifying each of said predetermined responses, and furnishing a plurality of output signals, each signifying the total number of participants selecting a given one of said predetermined responses.

In a preferred embodiment of the present invention the communications network is the telephone system and the input signals are put on a telephone line regardless of the state of operation of the telephone receiver. Further, at the central station the signals are filtered from the line prior to the cross bar or switching equipment.

In this way, it is possible for the persons interviewed quickly to reply to any proposed question with an information signal transmitted through their own telephone line, without needing to dial any number and independently of the operational condition of the telephone receiver, reaching the telephone central station where they are decoded.

The presence or not of the information at the telephone central station will actuate a digital system that in the simplest case meas a "Yes" or "no/" information which is accumulated and then retransmitted to the central point of statistical computation.

There the information from all telephone central stations is filtered, detected and sorted being then added individually and displayed automatically.

For adding, analysis and display, an electronic computer may be used.

As aforementioned, the information is supplied by the participant through a selection on the answer box, or indirectly, as by the selection of radio station on a radio receiver or a television channel on a television receiver.

In a preferred embodiment, the information furnished automatically will not only comprise the selected answer, but will also inform about the operational conditions of the television receiver or other apparatus connected with it.

As the information signals should not disturb and not be disturbed by the normal signals on the telephone line, they should differ from the latter and this invention foresees the use of alternating current signals whose frequency is higher than the highest frequency signals of a normal telephone line.

To this end information frequency will be chosen conveniently above 4KHz while different information signals may be transmitted at other frequencies.

It is also suggested that the information not be transmitted continuously, but by AC bursts of a limited duration. In such an embodiment, different responses may be differentiated by the use of different burst lengths. Alternatively, the same burst length but different frequencies may be used.

At the reception point, i.e., the telephone station, before the switching system there is a filter corresponding to each telephone line, which only passes the frequency of the response signals.

After said filter there is a decoder, which transforms the information received into a corresponding level of continuous predetermined current.

In a preferred embodiment four possible responses are foreseen coming through from each telephone line. The decoder can supply four possible different output levels of continuous current, of which corresponding ones are added and the final sum sent directly or after a conversion into a digital form, to the central computation station.

Another aspect of this invention is the fact that it is possible to send from the central computation station, through the telephone station and the telephone line to the participant, command signals defining the exact time allowed to signalize the answer.

Questions may be supplied to the participants either by radio or television programs or by means of newspaper adds.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS:

FIGS. 4A and 4B together constitute a detailed block diagram, including schematic circuit diagrams, of the answer box controlled by the participants;

FIGS. 9A 9B and 9C together form a detailed block diagram of an analog/digital embodiment of the adders of FIG. 5.

DESCRIPTION OF THE PREFERRED EMBODIMENTS:

Preferred embodiments of the present invention will now be described with reference to the drawings.

Figure 1:
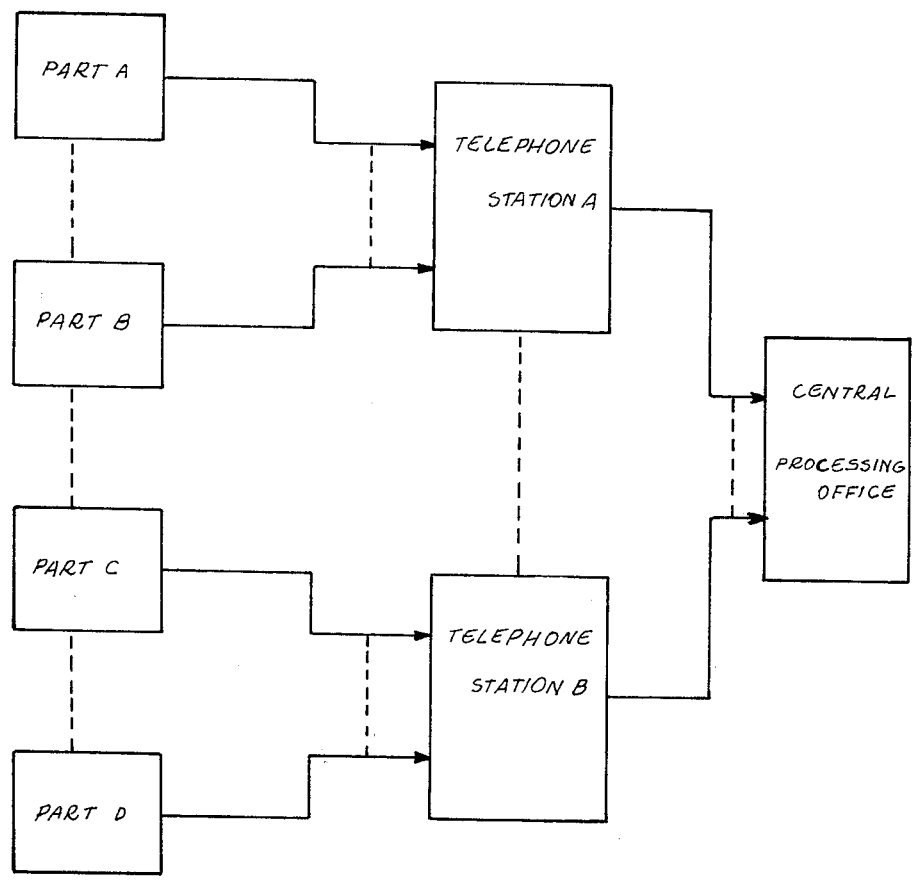
FIG. 1 is an overall block diagram of the public opinion research system of the present invention.

FIG. 1 shows the overall block diagram of a system in accordance with the present invention. Thus, at the time the poll is conducted, each participant operates his answer box, labelled "PART A", etc. in FIG. 1 to select one of a plurality of predetermined responses. A corresponding coded signal is sent via a telephone line to a corresponding telephone station. The telephone stations have equipment for decoding the signals and adding all signals corresponding to the same answer. The resulting totals are then sent from each telephone station via a private telephone line to the central processing office. There the results received from all telephone stations are again summed and optical displays are activated which give the results of the polls in a visible manner.

Figure 2:
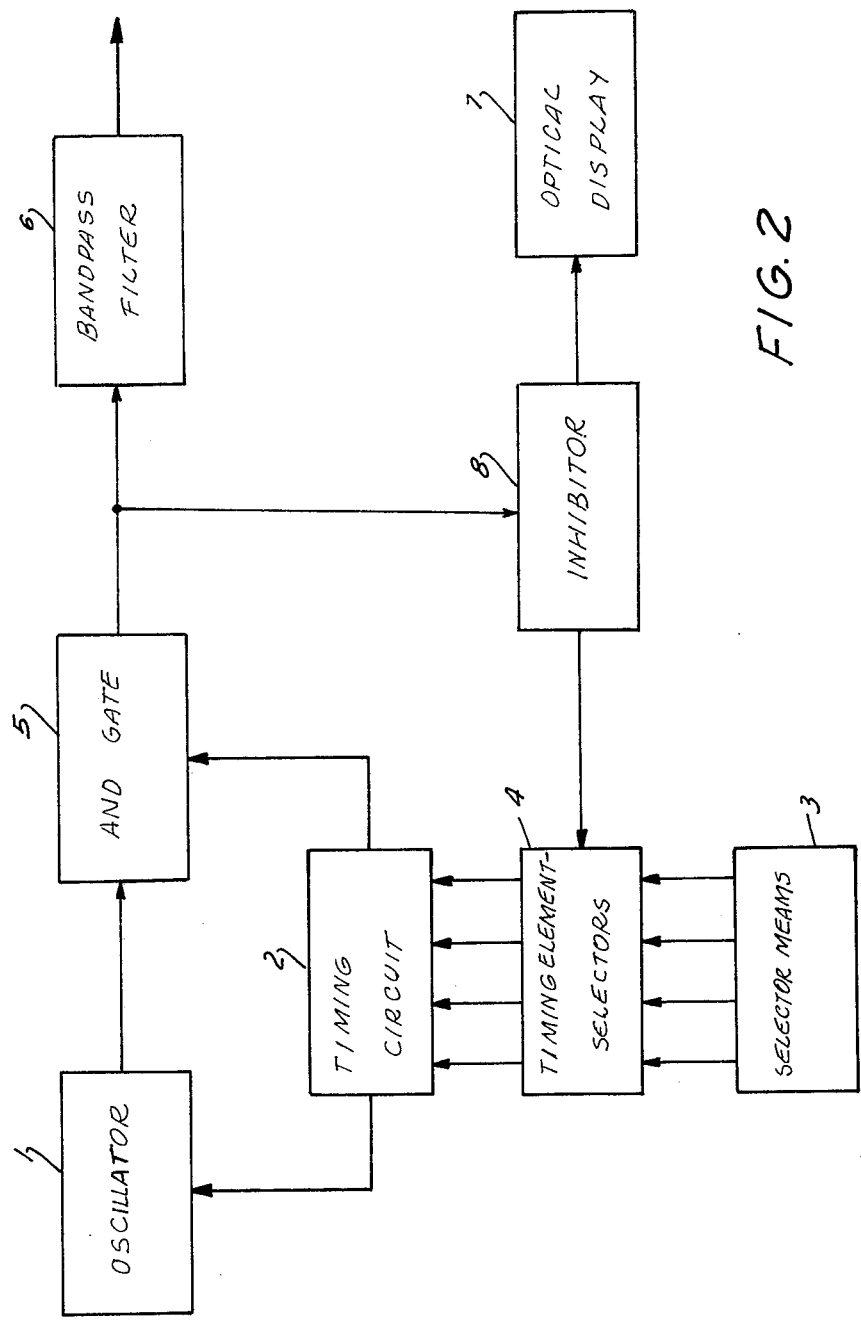
FIG. 2 is a generalized block diagram of the answer box controlled by each participant.

FIG. 2 shows the answer box at each participant's home. It comprises selector means labelled 3 in the drawing, which may be a keyboard or, as will be explained in more detail below in conjunction with FIG. 3, a rotary switch associated with the television tuner. The selected output of selector means 3 is applied to converter means, including boxes 1, 2, 4, 5, 6 and 8 of FIG. 1 which convert the selected answer to an AC burst having a burst length corresponding to said answer. Specifically, the output of the selector means 3 is applied to a timing element selector circuit 4 which causes the connection of a timing element corresponding to the selected answer to a timer circuit indicated by box 2 in FIG. 2. The timer circuit furnishes a gate which may be used either to control the on time of an oscillator 1 as indicated by the dashed-line connection between timer 2 and oscillator 1 in FIG. 2, or, if a continuously running oscillator is used, the timer gate may be used to activate an AND circuit 5, whereby the output of AND-gate 5 is a burst having a time length depending upon the data furnished by the timer circuit. The frequency of oscillation of oscillator 1 must of course be higher than the range of frequencies transmitted for telephone operation. A band pass filter 6 is connected to the output of AND-gate 5 so that the band width of the output signal is strictly limited to prevent interference with telephone signals. If the gate furnished by timing circuit 2 is used directly to trigger oscillator 1 to the on condition, then gate 5 may be used to suppress the initial part of the oscillations, until such time as oscillator 1 has stabilized to its correct frequency. The output of band pass filter 6 is of course connected to the telephone line, and preferably connected in series therewith.

Further shown in FIG. 2 is an inhibitor circuit 8 which, in response to a signal at the output of AND-gate 5, inhibits any further selection of a timing element for a predetermined time period. In a preferred embodiment of the present invention the inhibit circuit comprises a monostable multivibrator and, further, controls an optical display 7 which indicates to the participant that no selection may be made.

All the circuits described above are conveniently housed in a unit having the selector means in an accessible position and comprising integrated circuits mounted on printed circuit boards.

Alternatively, the equipment may be incorporated into a telephone receiver.

The electrical supply for the equipment may be an alternating current network or the telephone line current or a battery.

Figure 3:
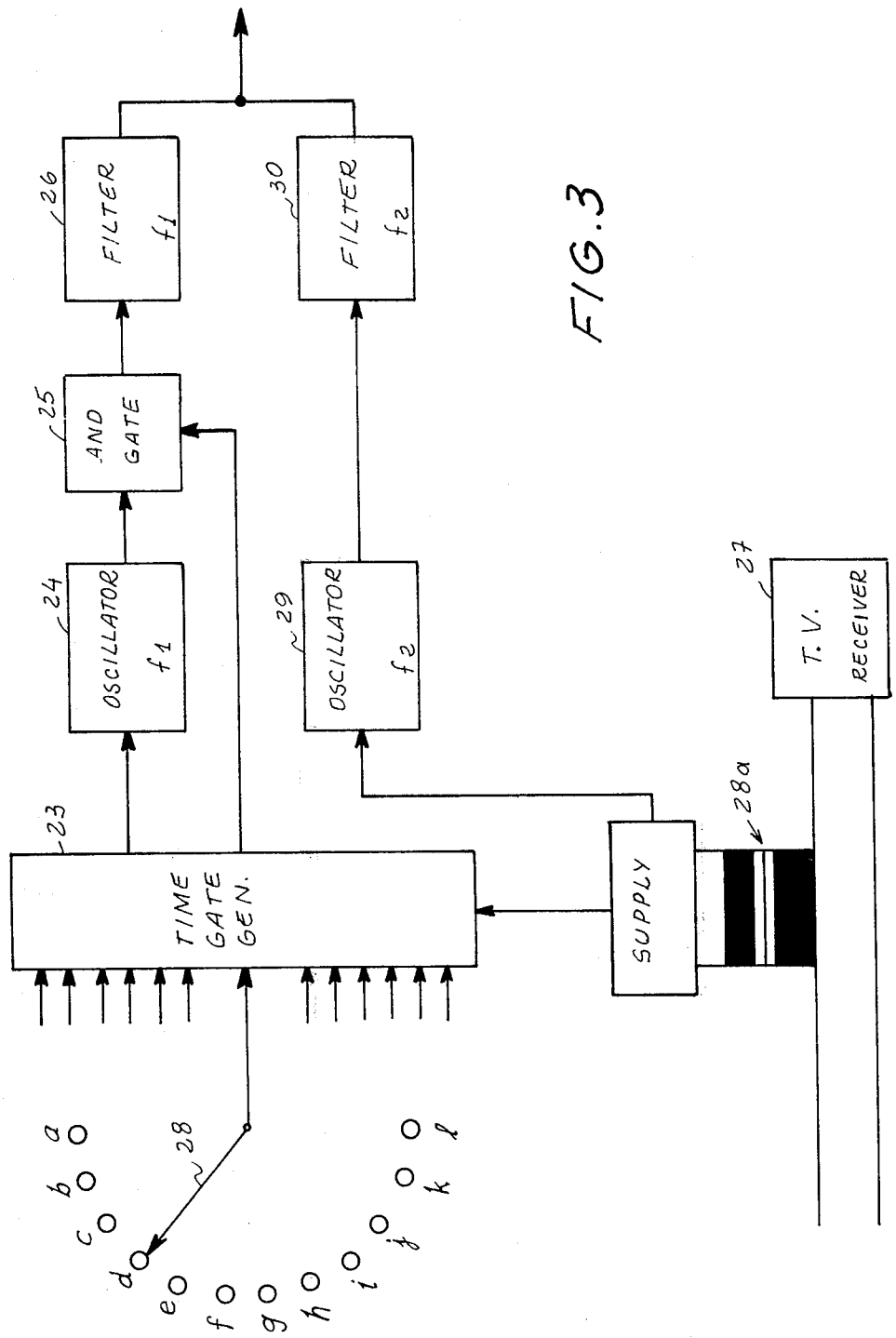
FIG. 3 is a block diagram of the answer box when used in conjunction with a television receiver.

In the embodiment shown in FIG. 3, the timer 23, the oscillator 24 with frequency F1, the AND-gate 25 and the filter 26 corresponds basically to stages 2, 1, 5 and 6 of FIG. 1. The timer 23, however, is not commanded by a keyboard, but by a rotary selector switch 28 connected to the TV tuner axis 27 or other mechanical device making sure that to each switch position corresponds to a TV channel.

Based upon the position of the switch 28, i.e. the position of the TV tuner, oscillator 24 will supply an AC burst of frequency F1 to telephone line 7, each burst length corresponding to a different channel.

To the AC source of the TV receiver is connected a current transformer 28a that will supply the necessary power to the answer box. So, as soon as the TV receiver is "on", power will be supplied to the equipment and it will energize an oscillator 29 of frequency $F_2$ running continuously. The oscillator 29 output will pass through a filter 30 and feed line 7. The oscillator $F_1$ will only supply information when power is supplied and when the TV channel being received is changed.

Figure 4A:
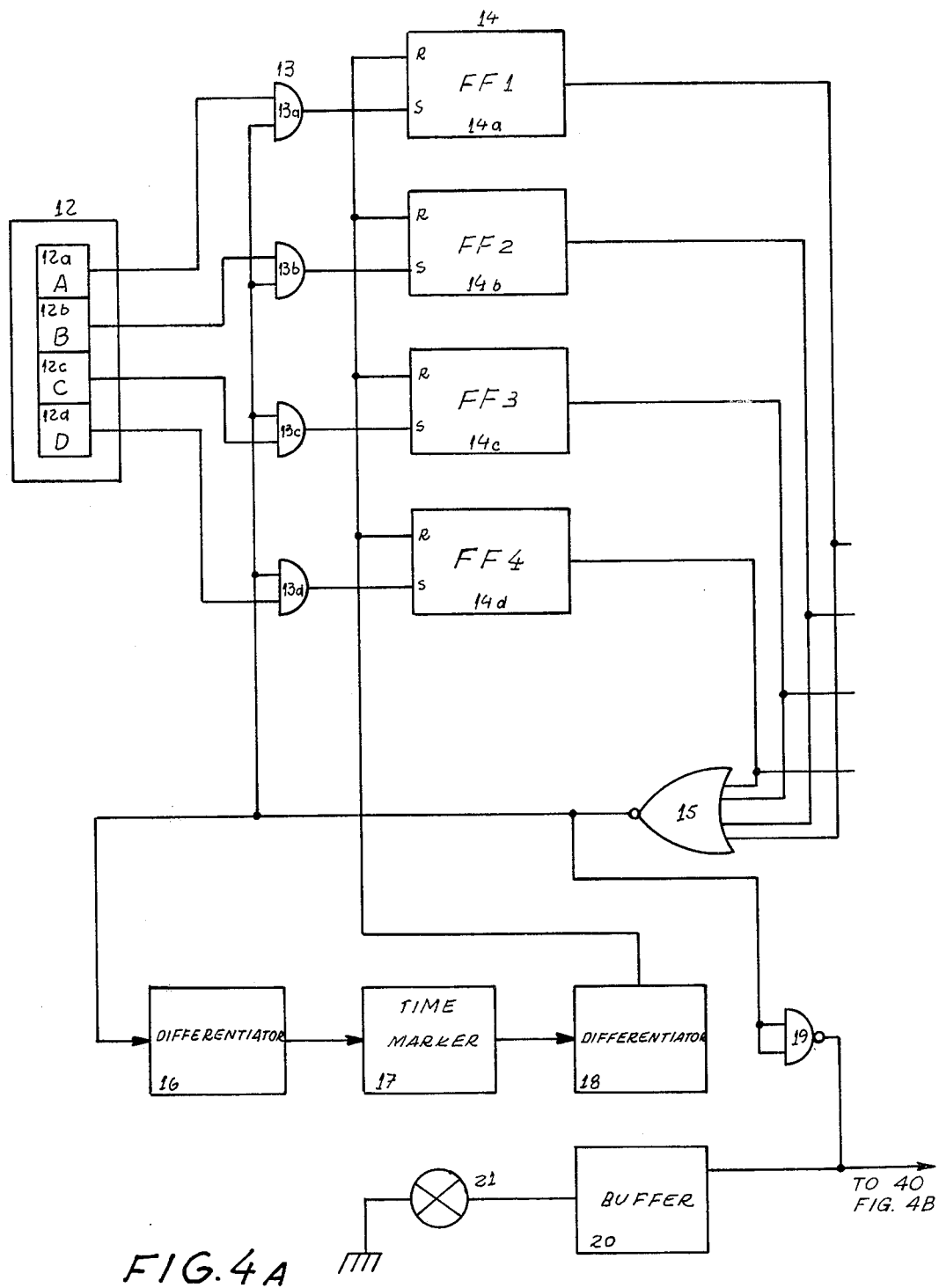

A preferred embodiment of the answerbox will be described in detail with reference to FIGS. 4A and 4B. In FIG. 4, the selector means are a keyboard 12, having keys A, B, C and D. The keyboard has a mechanical inhibit which prevents the possibility of more than one key being pressed at the same time. Each key of the keyboard is connected to the first input of a corresponding AND-gate, namely gates 13a–13d. The second input of the AND-gate is connected to the output of a NOR-circuit 15 whose inputs are connected to the Y outputs of flip-flops FF1, FF2, FF3 and FF4. The outputs of AND-gates 13a–13d are connected to the set inputs of flip-flops FF1–FF4 respectively. flip-flops FF1–FF2 are preferably integrated R-S flop-flops having a R (reset) input and a S (set) input and a Y as well as a Ȳ output. The output of NOR-circuit 15 is further connected to the input of a differentiator circuit 16 whose output is again connected to a time marker circuit 17. The output of time marker circuit 17 is connected to the input of a differentiator 18 whose output is connected to the R input of flip-flops FF1–FF4. The Y outputs of FF1–FF4 are connected, respectively, to the coils of relays 22a–22d. When a current flows through any one of the coils of relays 22a–22d, the corresponding pair of relay contacts 23a–23d closes, thereby connecting a capacitor 23'd, 23'c, 23'b or 23'a to a monostable multivibrator 40, which is one embodiment of timing circuit means 2 of FIG. 2. The above-mentioned relays and their contacts therefore form the timing selector means designated by stage 4 in FIG. 2. The input of monostable multivibrator 40 is connected to the output of NOR-gate 15 through an inverter 19. The output of monostable multivibrator 40 is connected to one input of and AND-gate 25' which corresponds to AND-gate 5 of FIG. 2. The other input to AND-gate 26 is the output of a free running astable multivibrator 24', which corresponds to oscillator 1 of FIG. 2. The output of AND-gate 25' is connected through a band-pass filter 26' to the telephone line.

The above-described equipment operates as follows:

Selection of one of the keys A–D causes a "1" input to be applied to the corresponding AND-gate 13. At this point the output of NOR-gate 15 is also a "1", thereby causing the "1" input to be applied to the set input of the corresponding flip-flop 14. A "1" output therefore appears at the Y output of said flip-flop, thereby causing the output of NOR-gate 15 to become a "0". NOR-gate 15 thus serves as an inhibitor, preventing any further activation of keyboard 12 from becoming effective in the remainder of the circuit until after a predetermined delay time which is sufficient for the data to be correlated at a central station. The generation of this delay time will be described below.

The "1" output at one of the flip-flops FF1–FF4 further causes the energization of a coil of one of the relays 22. Therefore, a corresponding capacitor 23' is connected to monostable multivibrator 40. The monostable multivibrator is triggered through the output of NOR-gate 15, after said output has passed through an inverter 19. It should be noted that the input of monostable multivibrator is a differentiating circuit comprising a capacitor 31a and a resistor 30. The monostable multivibrator is thus triggered to the unstable state, the time period for which it remains in said state being determined in the main by resistor 39 and the capacitor 24 which has been selected. While the monostable multivibrator is in said unstable state, a "1" input is furnished from its output to AND-gate 25', thereby permitting oscillations supplied by astable multivibrator 24' to pass through band pass filter 27 and onto the telephone line. Thus a AC burst is generated on the telephone line which has a length corresponding to the selected timing element, namely one of capacitors 23', which in turn depends upon which of keys 12 has been activated. Simultaneously with triggering monostable multivibrator 40', the output of NOR-gate 15 is differentiated 16 thereby starting a time marker 17. Time marker 17 may also be a monostable multivibrator, but its time constant is adjusted so that the monostable multivibrator remains in the unstable state for a time period required to correlate the data at the central stations. Thus it may remain in the unstable state for example fifteen minutes. When the time marker changes state, the output is differentiated by differentiator 18 and the resulting pulse applied to the R input of flip-flops FF1–FF4, thereby resetting these flip-flops and enabling a new selection to be made by keyboard 12.

Band pass filter 27 is a high Q circuit permitting only the fundamental frequency of astable multivibrator 25 to pass through telephone line 28. It may be either an active or a passive filter and could comprise integrated circuits, transistors or tubes.

An indicator lamp 21 connected to the output of inverter 19 through a buffer circuit 20 can serve to indicate to the participant that the circuit is in an inhibited state insofar as further inputs are concerned.

Figure 5:
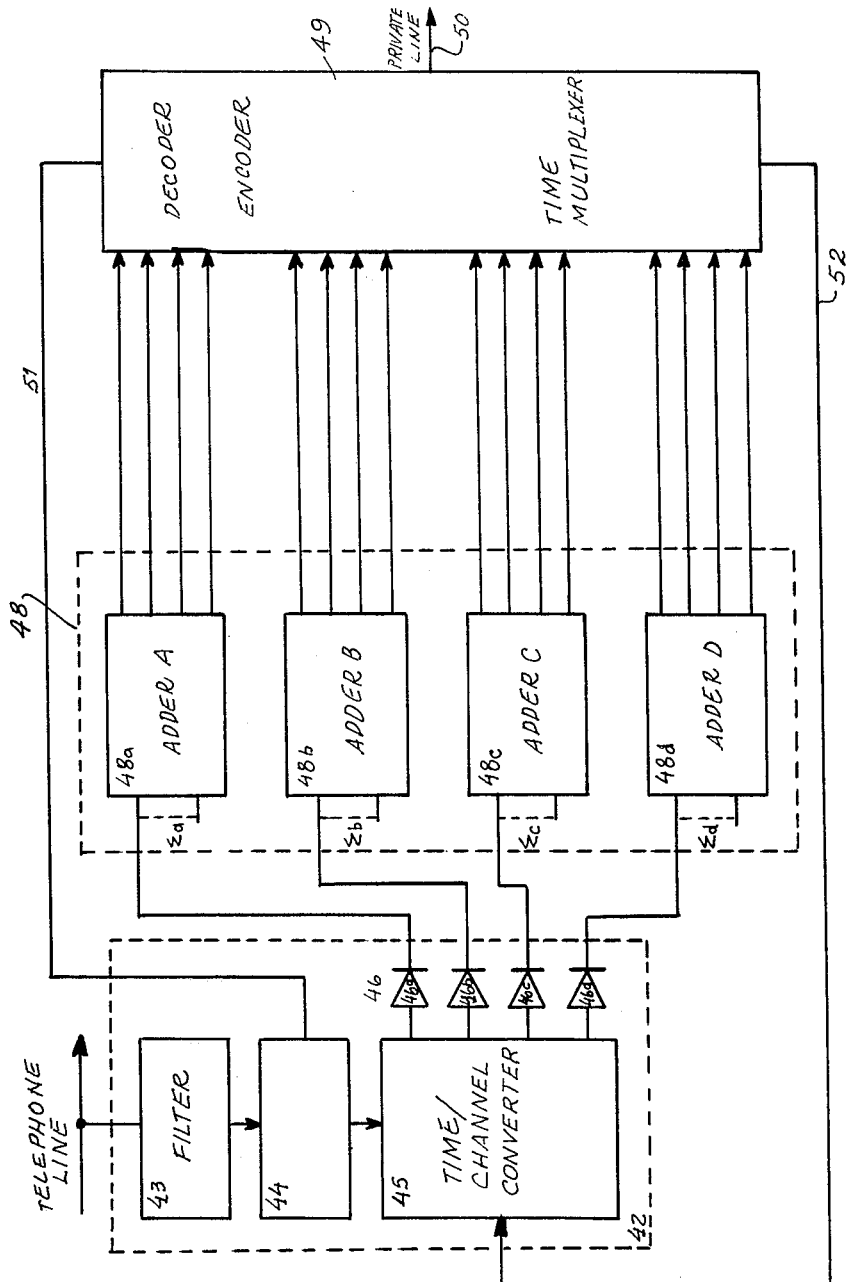
FIG. 5 is a general block diagram of the equipment at the telephone station.

In FIG. 5 the circuit at the reception point is shown. Each telephone line has an associated detector circuit 42 (shown in dotted lines). The shunt of the telephone line is made before the telephone switching circuits so that the information shunted from the telephone line goes first to a filter 43 of decoder system 42. Its output is fed into an AND-gate circuit 44 (described below) and is then connected to a decoder device 45.

This decoder has four outputs which pass through diodes 46a–d each output furnishing a response signal corresponding to activation of a corresponding one of keys 12 of FIG. 4. One embodiment of the decoder circuit will be discussed below with reference to FIG. 7. Decoder 45 is also herein referred to as time/channel converter or transducing means.

At each central station there are of course a plurality of these transducing means. The corresponding outputs of these transducing means are then connected to the input of summing circuit means 48. Specifically, the outputs 46a of all the transducing means at the central telephone station are connected to the input of an adder A, the outputs 46b are all connected to the inputs of an adder B, the outputs 46c are all connected to the inputs of an adder C and the outputs 46d are connected to the inputs of an adder D. Each of the adders will then carry an output signal which signifies the total number of participants which have chosen the particular one of the plurality of responses, that is have activated the same key on keyboard 12. The adder outputs which are in parallel form are then applied to a decoder/encoder and time multiplexer circuit, that is a circuit which converts the parallel outputs of the adders into series outputs and controls the timing thereof. The so time-controlled serial outputs are applied to a private telephone line 50 through which they are transmitted to the central computation station. The decoder/encoder unit has an output through a line 51 which is applied to AND-gate 44 and causes this AND-gate to be disabled while the data is being processed in block 48 and 49. After all information has been transmitted to the computation center, a signal on line 52 causes stage 45 to be reset and new information to be furnished at its various outputs.

Figure 6:
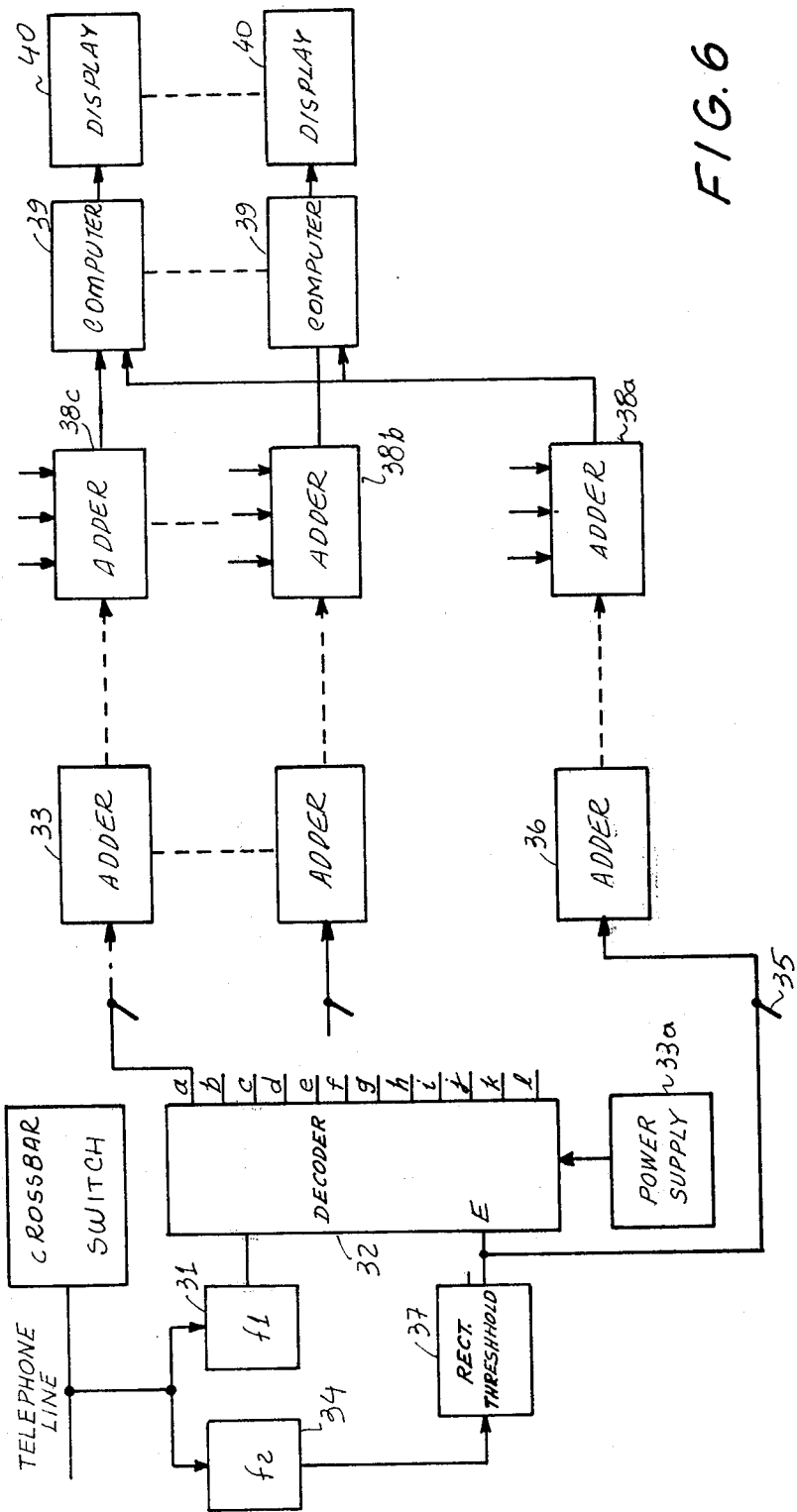
FIG. 6 is a block diagram of equipment at the telephone station when used in conjunction with the answer box shown in FIG. 3.

A preferred embodiment of the equipment at the central telephone station, when the answer box is the equipment shown in FIG. 3, is shown in FIG. 6. Just as in FIG. 5, the telephone line is tapped prior to the crossbar or switching system. However, in FIG. 6, the so-tapped signal is put through two filters, namely a filter 31 tuned to the frequency of oscillator 24 of FIG. 3 and a filter 34 tuned to the frequency of oscillator 29 of FIG. 3. Filter 31 and decoder 32 are the same as filter 43 and decoder 45 in FIG. 5, except that decoder 32 has twelve outputs, one corresponding to each channel selectable by the TV tuner of FIG. 3. A precision power supply 33a supplies the power for decoder 32. The output of filter 34 may be rectified and applied to a threshold circuit, both contained in stage 37. The threshold circuit and stage 37 yields an output only in the presence of a output from filter 34. This signal may be used as a third input (not shown) to AND-gate 57 of FIG. 7 which will be discussed below in conjunction with this Figure. The output of stage 37 is also applied to the input of an adder 36. The corresponding outputs of filters associated with other telephone lines received at the particular central station are also applied to adder 36 whose output thus constitutes a signal signifying the sum of all television sets in operation. The summing circuit means, shown as adders in FIG. 6 operate in the same manner as the adders contained in summing circuits 48 of FIG. 5. The outputs of adders 33, as well as adder 36 are then transmitted via a private telephone line to the central computation center. Here inputs from a plurality of private telephone lines are added in adders 38, each of adders 38 thus furnishing a signal signifying the sum total of all participants selecting a particular response. Further provided at the computation center is an adder 38a which sums all adder 36 outputs received through the various private telephone lines. Further, computing circuits 39 then each form a ratio consisting of the output of an adder 38 divided by the output of adder 38a. The outputs of computing circuits 39 thus are percentages of participants operating their television sets and tuned to a particular channel. The resulting percentages are then displayed on display means 40, which form the final output of the public opinion research system which is the subject of the present invention.

Figure 7:
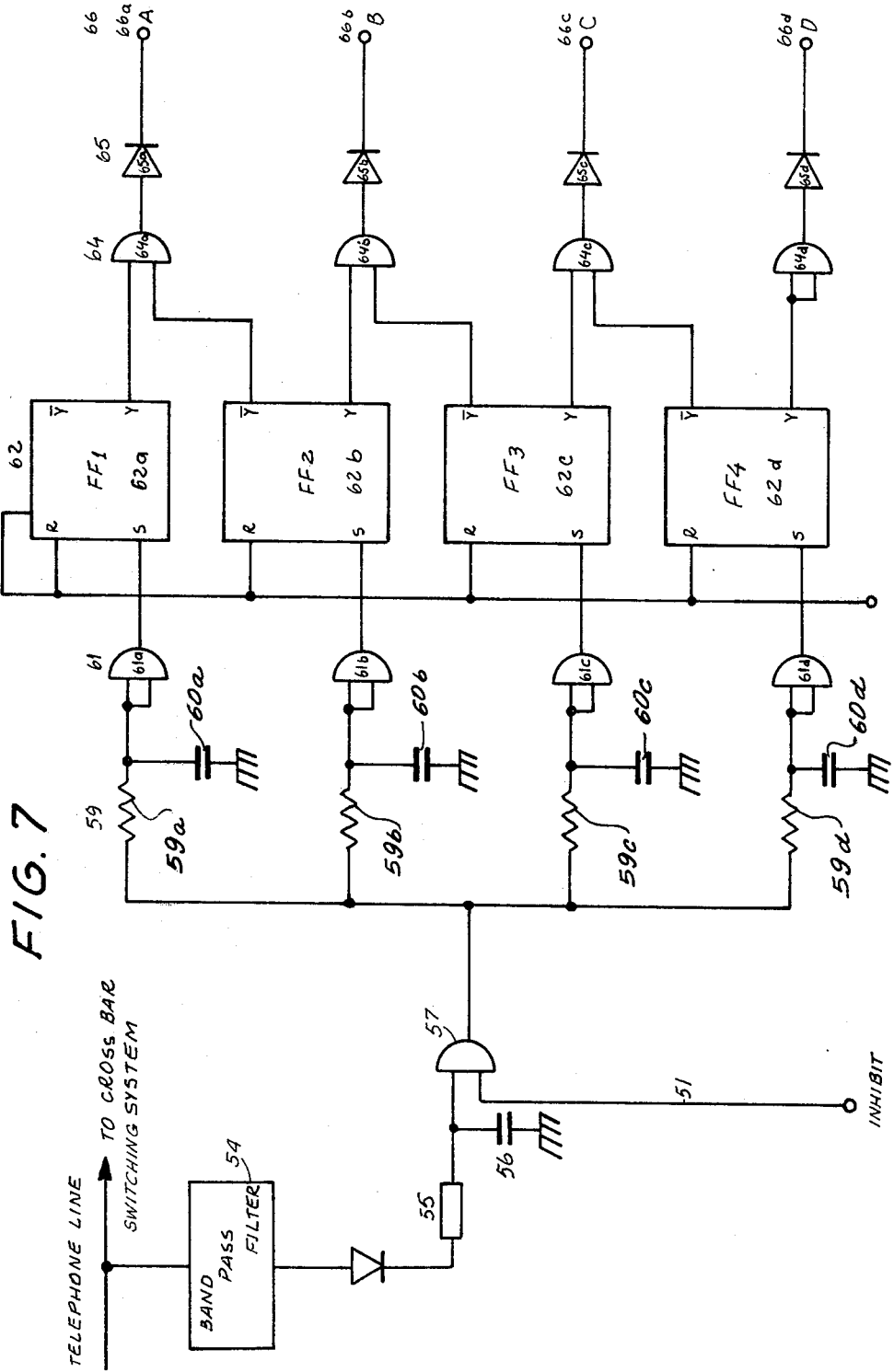
FIG. 7 is a detailed block diagram of the decoder of FIGS. 5 and 6.

A preferred embodiment of unit 42 shown in FIG. 5 is shown in FIG. 7. The input signal transmitted by a particular participant is received through the telephone line which is tapped prior to the cross-bar system. It passes through a band pass filter 54 which is tuned to the corresponding frequency. The signal at the output of band pass filter 54 constitutes the response signal. The response signal then passes through a diode and an RC circuit comprising a resistor 55 and a capacitor 56. The voltage across capacitor 56 constitutes one input of an AND-gate 57 whose other input is the inhibit signal furnished by the decoder/encoder of FIG. 5 on the line 51. The voltage across capacitor 56 causes a "1" input to be applied to the corresponding input of AND-gate 57 while the response signal is present. In the absence of an inhibit signal the output of AND-gate 57 will be a "1" during the burst length of the response signal. The output of AND-gate 57 is applied to four AND-gates 61a–61d through delay circuits each comprising a resistor 59 and a capacitor 60. The RC time constant of each of these circuits is different. Each AND-gate 61a–61d serves actually as a threshold circuit, since both of the inputs are tied together. The RC circuits 59–60 are so designed that each AND-gate 61a–61d furnishes a "1" output after a different predetermined time constant $t_1$, $t_2$, $t_3$ and $t_4$, respectively. If for example the response signal has a burst length corresponding to the activation of keyboard key C, the output signal of AND-gate 57 will have a time duration sufficient to cause AND-gate 61c to have a "1" output. Time delays $t_1$–$t_4$ are arranged in an increasing order. Thus, upon activation of key C, AND-gates 61a, 61b and 61c will all have a "1" output. Since the outputs of AND-gates 61a–61d are applied, respectively, to the set input of flip-flops 62a–62d, under the above-mentioned conditions flip-flops 62a–62c will have a "1" output, while the output of flip-flops 62d will be a "0" output.

Connected to the Y output of flip-flops FF1–FF4 are the first inputs of AND-gates 64a–64d. The second input of AND-gate 64a is connected to the $\overline{Y}$ output of flip-flop 62b, the second input of AND-gate 62b is connected to the $\overline{Y}$ output of flip-flop 62c and the second input of AND-gate 64c is connected to the $\overline{Y}$ output of flip-flop 62d. The two inputs of AND-gate 64d are connected in common. Under the specified conditions and keeping in mind the above-described connections, the output of AND-gate 64a will be "0" since the $\overline{Y}$ output of flip-flop 62b is not energized. Similarly the output of AND-gate 64b will be a "0" output since the $\overline{Y}$ output of flip-flop 62c is deenergized. However, AND-gate 64c will have a "1" output since both the Y output of flip-flop 62c and the $\overline{Y}$ output of flip-flop 62d are energized. This "1" output is applied to a terminal C through a diode 65c. Diodes 65a–65d, each connected to the output of a corresponding one of AND-gates 64 of course correspond to diodes 46a–46d of FIG. 5.

Figure 8A:
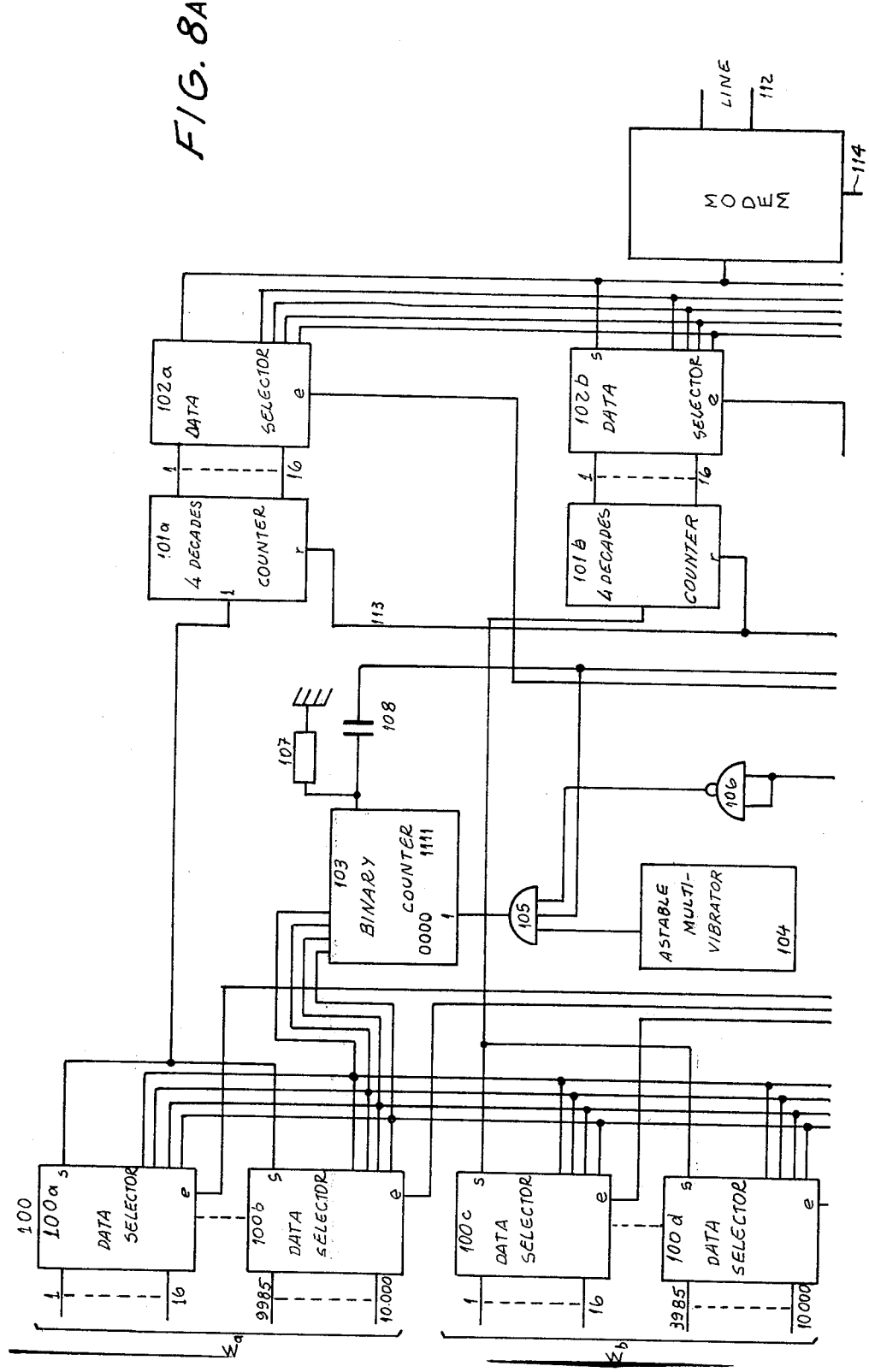
FIGS. 8 and 8B together from a detailed diagram of a digital embodiment of the adders of FIG. 5.

The summing circuits 48 of FIG. 5 may be implemented in either analog or digital form. A completely digital embodiment of the summing circuits is shown in FIGS. 8A and 8B which should be taken together and aligned for easier reference. Outputs A, B, C and D of FIG. 7 are each connected to the input of a data selector shown as 100a to 100h. Assuming a system for 10,000 participants, each able to choose one of four options, there will be twenty-five hundred data selectors at the input of the summing circuits. These could be of any suitable type, for example integrated circuits. Each will have sixteen inputs, one output, four programming inputs and one enable input. The data selectors are commercially available units which, when programmed with a binary code, will sequentially connect each of their inputs to the output. The outputs of all the data selectors 100 are connected in turn to the input of counter 101. Each of counter stages 101a–101d is a standard commercially available unit having 16 outputs, 1 input, and a reset input. Each counter 101 counts one particular response or option as follows: counter 101a counts the number of participants that selected option A, counter 101b option B, etc. Thus after all the inputs of data selectors 100 have been swept sequentially, all the results are stored in counters 101. The sweeping of the data selector inputs is carried out by the combined action of an oscillator 104, a binary counter 103 and a ring counter 109. Oscillator 104 is of any suitable type, preferably an astable multivibrator, whose output is connected to the input of binary counter 103 through an AND-gate 105. The binary counter is constituted by four flip-flops whose outputs vary from "0000" to "1111" with sixteen different combinations inbetween. In response to each of these combinations, applied at the programming inputs, a different input is connected to the output of the data selector.

The data selector programming inputs are all connected in parallel. Thus for each complete cycle from "0000" to "1111" of the binary counter, all data selectors will sweep their sixteen inputs simultaneously. It further then remains to cause only one data selector to be enabled at any one time. This process is carried out by ring counter 109 (FIG. 8B) which again may be of any convenient type having 2,506 outputs, one pulse input and one reset input.

Each time that binary counter 103 completes a cycle, arriving at "1111" AND-gate 110 sends a pulse to ring counter 109. This advances the output of ring counter 109 to its next subsequent output, thereby enabling the next data selector. After all data selectors have been scanned in this manner, counter 101a has a count signifying the number of participants selecting option A, counter 101b has a count corresponding to the number of participants electing option B, etc. The outputs of the counters 101 are in turn connected to the inputs of data selectors 102, namely data selector 102a, 102b, 102c and 102d. These data selectors are entirely similar to data selectors 100. The outputs of these data selectors are sent through a modulator-demodulator 111 to a private line 112 which connects the central telephone station to the central computation station. The sweeping of the outputs of data selectors 102 is controlled in identical manner as that of data selectors 100 by means of binary counter 103, astable multivibrator 104 and ring counter 109. Ring counter 109 automatically enables the first of the output data selectors after enabling the last of the input data selectors. This serial sweeping of the outputs of data selector 102 causes the information which is stored therein in parallel form to be transformed into serial form. The information is then modulated onto a carrier in modem 111 are transmitted through the private telephone line 112 to the central computation station.

The complete reading process described above is started by a signal transmitted from the central computation station to modem 111 through private line 112. This signal is furnished on line 114 at the output of modem 111. It is differentiated by a differentiating circuit comprising a capacitor 115 and a resistor 116. The so-differentiated pulse is applied to the reset inputs of binary counter 103 and ring counter 109. Since ring counter 109 has been reset, the output at its zero terminal will be a logic "1" while the remaining outputs are "O". The output of AND-gate 106, which is used as an inverter, is thus a "1". Thus AND-gate 105 is conductive, allowing the oscillations from oscillator 104 to be applied to the inputs of binary counter 103. Thus the sweeping process is started. The "1" signal at the zero output of ring counter 109 also resets counter 101. The signal on line 114, inverted by an inverter 117, serves as the inhibit signal at the input of AND-gate 57 of FIG. 7. The reset signal required for the circuit of FIG. 7 is supplied by the 2,506 output of ring counter 109. It should also be noted that when the 2,506 output of ring counter 109 is reached, AND-gate 106 will have a "O" output thereby blocking AND-gate 105.

Figure 9A:
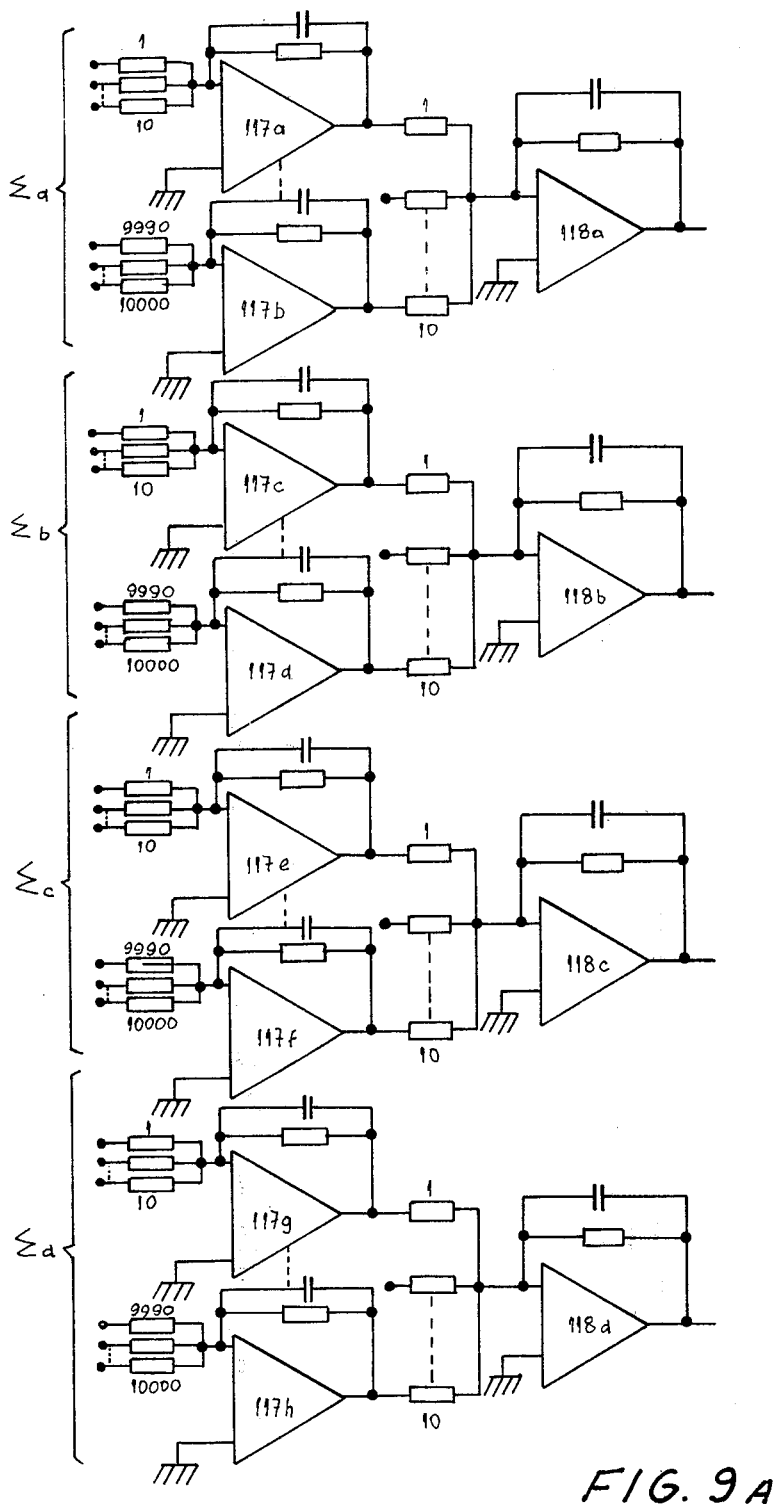
Figure 9B:
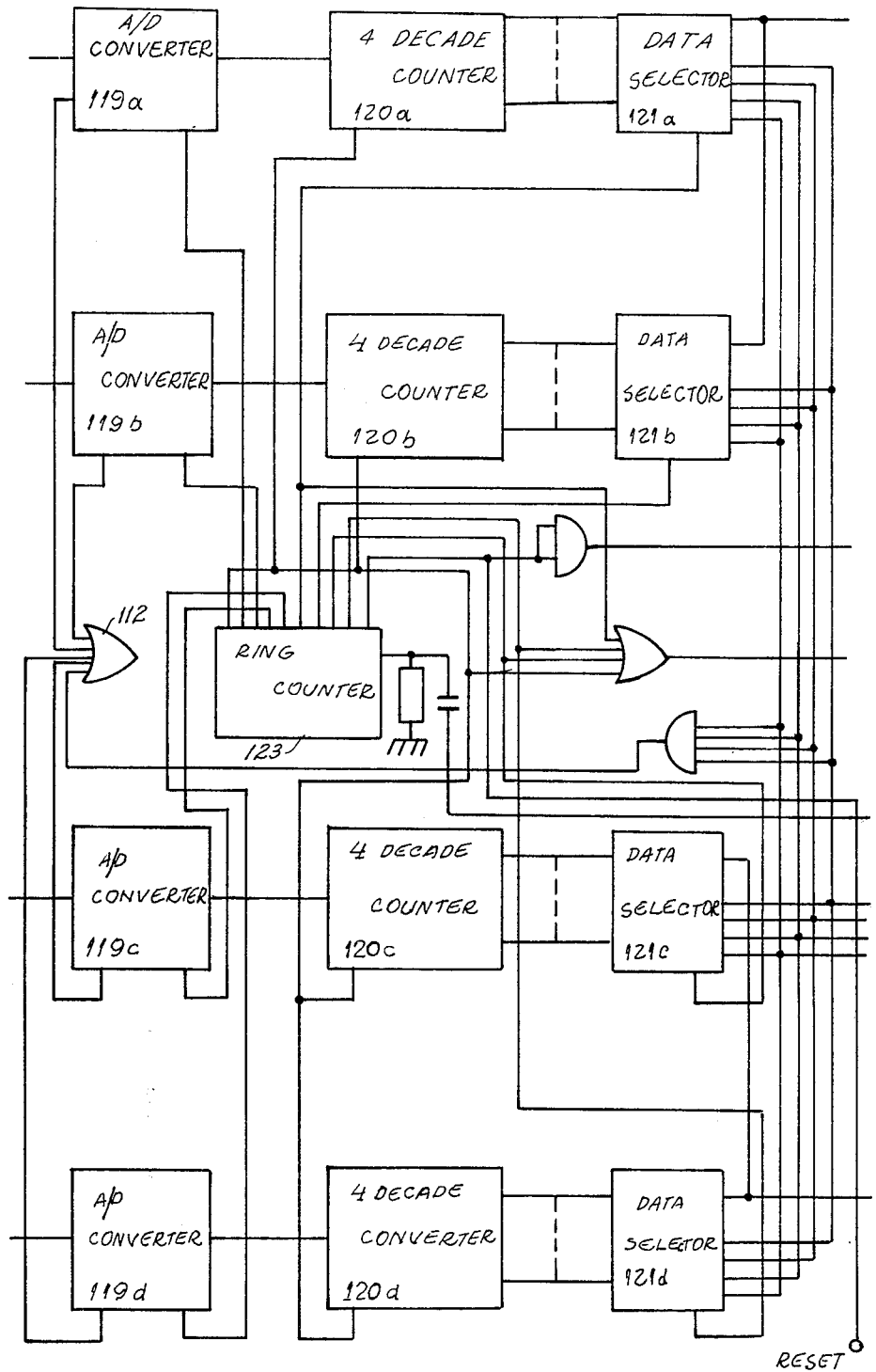

An analog/digital embodiment of the summing circuits is shown in FIG. 9. In FIG. 9, the outputs A, B, C and D of FIG. 7 are connected, respectively, to the inputs of operational amplifier 17a, b; 17c, d; 17e, f; and 17g, h. These operational amplifiers operate as adders. There are ten inputs connected to each operational amplifier 117, so that for the case of 10,000 participants, there will be 1,000 operational amplifiers for each option. The outputs of each group of operational amplifiers are connected to another group of operational amplifiers also working as analog adders and also having ten inputs. This process is repeated until finally a group of operational amplifiers shown in the Figure as amplifiers 118a, 118b, 118c and 118d each have an output respectively representing the total number of participants choosing option A, B and C, D. For the assumed case of 10,000 participants the total number of operational amplifiers required will be 4,444. In a preferred embodiment of the present invention these operational amplifiers are all integrated circuits.

The outputs of the above-described operational amplifiers 118 are connected to corresponding analog/digital converters having reference numerals 119a, 119b, 119c and 119d. Again, the analog/digital convertors are standard commercial units, preferably in integrated circuit form, and having an analog information input T, an inhibit input I, a digital information output and an end-of-process indicator output P. These analog/digital converters 119 receive the analog information from adders 118 and, when suitably energized at the inhibit input, convert the analog information to digital information which, in turn, sent to counters 120. The analog-digital convertors 119 are sequentially enabled by a ring counter 123.

Each time one of converters 119 finishes the converting process, it sends a signal through output P that passes through OR-gate 112 and activates ring counter 123, advancing this counter by a step and thereby enabling the next convertor. Thus the analog information of operational amplifiers 118 is transferred in digital form to counters 120. These counters 120 are of the same type as the counters 101 of FIG. 8 and the remaining process of transferring the data to the central computation station is identical to that discussed with reference to FIG. 8 and will not be repeated here. The difference between FIGS. 8 and 9 is merely that the original summing is accomplished in digital form in FIG. 8 and in analog form in FIG. 9.

Figure 10:
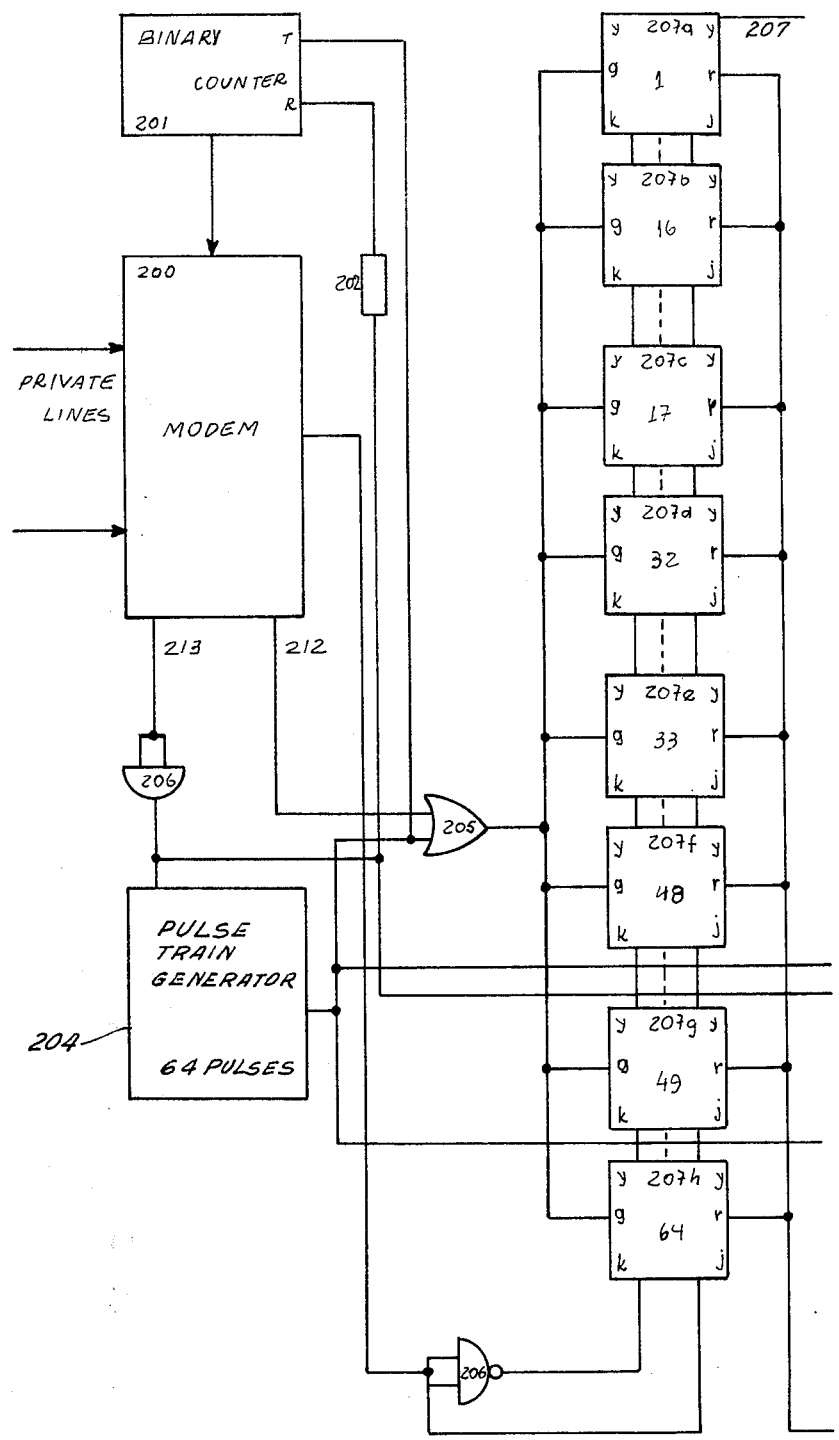
FIGS. 10A and 10B together constitute a block diagram of the equipment at the central computing station.
Figure 10B:
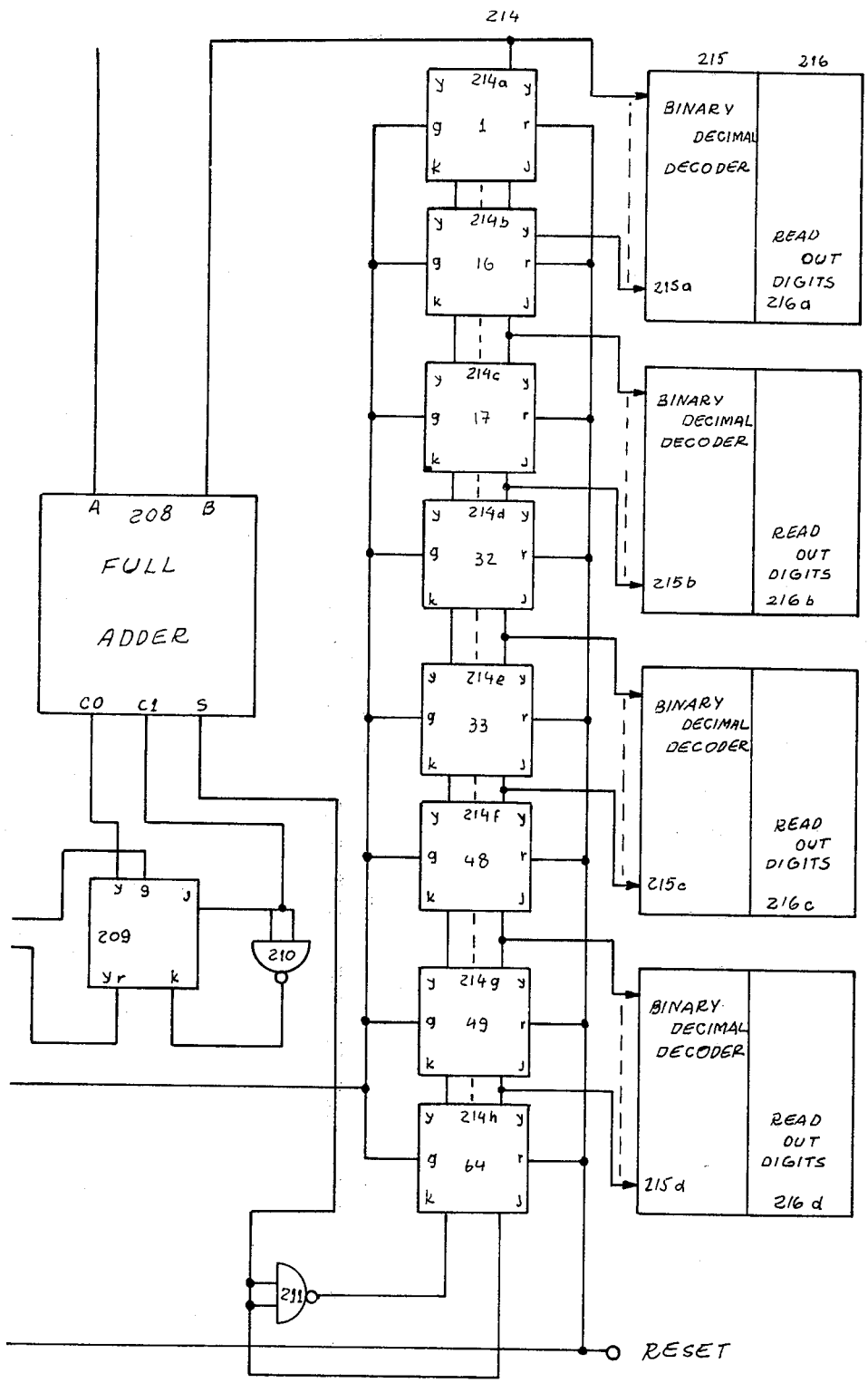

FIG. 10 shows one embodiment of the computing equipment at the central computation station. The signals sent out by the modulator-demodulator of FIGS. 8 and 9 are received by a similar unit labelled 200. Of course the unit 200 receives inputs from a plurality of private lines such as private line 137 of FIG. 9. The inputs to modem 200 are interrogated in turn. Thus first modem 11 of the first telephone station will be interrogated. The data received from modem 111 is in serial form and represents the total results from that particular telephone station area. Since each central telephone station sends 64 information bits, a shift register 207 is supplied at the central computation station which has 64 flip-flops represented schematically by flip-flops 207a–207h. These flip-flops are any suitable type of JK master-slave flip-flop which are connected to form a shift register. Each time a pulse is applied to the gate labelled g in each of the flip-flops, the information in that flip-flop is shifted to the next subsequent flip-flop, that is for example the information in flip-flop 207h is transferred to flip-flop 207g. The pulses received by modem 200 are applied through an AND-gate 206 to the JK inputs of the first flip-flops 207h. It will be noted that the input is supplied directly to input j and in an inverted form to input k. This prevents any ambiguity in the setting of the flip-flop. Further, modem 200 supplies a pulse on line 212 for each received bit, this pulse being transmitted through OR-gate 205 to the above-mentioned g inputs of flip-flops 207. Thus when all serial information has been received from the first telephone station, this information is stored in flip-flops 207. At this point modem 200 generates a pulse at output 213 which, after passing AND-gate 203, activates the pulse train generator 204. This pulse train generator is of any suitable type, and supplies sixty-four pulses at its output Y from any pulse received at the input, which in turn is connected to the output of the above-mentioned AND-gate 203. The Y output of pulse train generator 204 forms one input of the above-mentioned OR-gate 205. Thus for each pulse furnished by pulse train generator 204, the information in flip-flops 207 is shifted once. The Y output of pulse train generator 204 is also applied to the g input of a plurality of flip-flops 214 which correspond exactly to the above-described flip-flops 207 both in number and in construction. Thus the information stored in the shift register comprising flip-flops 214 is also shifted sixty-four times for each pulse received at the input of pulse train generator 204. The output of the last stages of flip-flops 207 and flip-flops 214 are connected to two inputs of a full adder 208. Again this type of full adder is a well-known component which is readily available commerically. Adder 208 adds the two bits appearing at the inputs and furnishes a corresponding output signal representing the sum thereof at an output F which in turn is connected to the j, k input of flip-flop 214h through an AND-gate 211 which operates similarly to the above-described AND-gate 206. Thus for each pulse of pulse train generator 204, two digits, one from flip-flop 207a and one from flip-flop 214a are added and the sum is stored in flip-flop 214h. Following sixty-four shifts, the binary total of the information previously contained in shift register 207 and added to the information previously contained in shift register 214 is stored in shift register 214. The above is a serial adding process. After the adding process has taken place, shift register 207 is free to receive information from the next central telephone station. After the results from this station have been entered into shift register 207, the adding process again takes places, the count from the second central telephone station being added to the count on shift register 214, namely the count of the previous telephone stations. Thus shift register 214 always contains an accumulative total, shift registers 207 always receiving the information from the next subsequent central telephone station.

It will be noted that a binary counter 201 has an output connected to modem 200 and a count input which counts the pulses from pulse train generator 204. In response to the last pulse from this pulse train the count on binary counter 201 signals to modem 200 that the operation has been completed and that the next line may be interregated. Binary counter 201 also has a reset input which is triggered by the pulse received at the output of the above-described AND-gate 203. Binary counter 201 is thus reset prior to the generation of the first pulse from pulse train generator 204.

Adder 208 is a full adder having first adding input A, the second adder input B, a first carry input CO a carry output C1 and a sum output S. A JK flip-flop 209, the carry output from full adder 208 is applied to the j, k inputs of flip-flop 209 through an AND-gate 210 which operates identically with previously described AND-gates 206 and 211. The Y output of flip-flop 209 is connected to the carry input of adder 208, while the g input of flip-flop 209 is controlled by the pulses from pulse train generator 204. The reset input of flip-flop 209 is connected to the output of the above-described AND-gate 203, causing the flip-flop to be reset prior to each new adding operation.

After all the data from all the central telephone stations has been received, shift register 214 stores the total results. Specifically the first sixteen flip-flops 214, schematically indicated by 214a and 214b contain the sum total of all participants electing the A option, the next sixteen the total of participants selecting the B option, etc. This information is in binary form and is converted by binary-decimal decoders 215 into a decimal form. The output of the binary-decimal decoders is connected to an optical display. This optical display, numbered 216 in FIG. 10 then carries the numbers representing the respective totals of the participants electing options A, B, C and D.

It is seen that the above-described system forms a fully automatic system for gathering public opinion statistics from determined participants each electing one of a plurality of given sponsors or options.

While the invention has been illustrated and described as embodied in a specific computing and signal generating circuits it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. Public opinion research system for polling a plurality of participants each having access to a communication system transmitting communication signals within a predetermined frequency band, comprising, in combination, a plurality of selectively operative input means, one for each of said participants, each for furnishing, upon operation, an input burst signal of a length signifying a selected one of a plurality of predetermined responses, said input signal having a determined length differing from the corresponding characteristic value of input signals signifying others of said responses, said input signal further having a frequency outside of said predetermined frequency band, for simultaneous transmission of said communication signals and said input signal; connecting means connecting each of said input means to said communications network in such a manner that each of said input signals is transmitted to a central station of said communications network thereby furnishing a corresponding plurality of response signals at said central station; and summing circuit means at said central station for summing all response signals signifying each of said predetermined responses and furnishing a plurality of output signals, each signifying the total number of participants selecting a given one of said predetermined responses.

2. Public opinion research system as set forth in claim 1, wherein said communication system is a telephone network; wherein said predetemined frequency band is a low frequency band; and wherein said input signals have a frequency higher than the frequency in said predetermined low frequency band.

3. Public opinion research system for polling a plurality of participants each having access to a telephone network transmitting signals within a predetermined low frequency band, comprising, in combination, a plurality of selectively operable input means, one for each of said participants, each for furnishing, upon operation, an input signal signifying a selected one of a plurality of predetermined responses, said input signal having a frequency higher than the frequencies in said low frequency band, each of said input means comprising manually operable selector means each having a plurality of selector elements, and conveyor means responsive to the operation of any of said selector elements for furnishing a corresponding input signal, each of said converter means comprising burst furnishing means for furnishing an AC burst having a predetermined frequency and a predetermined burst length in response to operation of each of said selector elements, all of said AC bursts having the same frequency, AC bursts signifying different ones of said predetermined responses having different burst lengths; connecting means, comprising filter means having a band pass including the frequencies of said input signals and rejecting all other frequencies, for connecting each of said input means to said communications network in such a manner that each of said input signals is transmitted to a central station of said communications network thereby furnishing a corresponding plurality of response signals at said central station; semi-transducer means at said central station, said transducer means comprising a plurality of transducers each having an input connected to a given telephone line, the number of said transducers corresponding in number to the plurality of participants connected to said telephone line, each of sand transducers having a plurality of transducer outputs corresponding in number to said plurality of predetermined responses, for furnishing, in response to each of said response signals, a transducer output signal at the one of said transducer outputs corresponding to the burst length of said response signal; and summing circuit means at said central station, for summing all response signals signifying each of said predetermined responses, and furnishing a plurality of summing output signals, each signifying the total number of participants selecting a given one of said predetermined responses, said summing circuit means comprising a plurality of counter means corresponding in number to said plurality of predetermined responses, each for furnishing a counter output signal signifying the total number of participants connected to said telephone line who have selected a corresponding one of said predetermined responses; a private communication line interconnecting said central station and a computation station; and parallel-series converter means connected to the output of said counter means for transmitting said counter output signal in series form over said private communication line.

4. A system as set forth in claim 1, wherein said connecting means comprise filter means having a band pass including the frequencies of said input signals, and rejecting all other frequencies.

5. A system as set forth in claim 4, wherein each of said input means comprise manually operable selector means each having a plurality of selector elements, and converter means responsive to the operation of any of said selector elements for furnishing a corresponding input signal.

6. A system as set forth in claim 5, wherein said converter means comprise burst furnishing means furnishing an AC burst having a predetermined frequency and a predetermined burst length in response to operation of each of said selector elements.

7. A system as set forth in claim 6, wherein said AC bursts all have the same frequencies.

8. A system as set forth in claim 7, wherein said selector means comprise keyboard means.

9. A system as set forth in claim 7, wherein said selected one of a plurality of predetermined responses is a selected channel of a plurality of television channels on a television receiver having a tuner; and wherein said selector means comprise rotary switch means mechanically coupled to said tuner.

10. A system as set forth in claim 9, further comprising a source of AC power; and means connecting said AC power to said input means only when said television receiver is energized.

11. A system as set forth in claim 10, wherein said means connecting said AC power to said input means comprise current transformer means.

12. An arrangement as set forth in claim 11, further comprising control oscillator means connected to said current transformer means for furnishing a control signal signifying television receiver operation.

13. A system as set forth in claim 12, wherein said control oscillator means has a predetermined control frequency; further comprising filter means connecting said control oscillator means to said telephone network, said filter means passing said control frequency and rejecting frequencies above and below said control frequency.

14. A system as set forth in claim 7, wherein said converter means comprise first oscillator means furnishing an oscillator output signal; first AND-gate means having a first input connected to said oscillator means, a second input, and an output connected to sand band pass filter means; a plurality of timing elements; timing circuit means furnishing timing pulses having a pulse width varying in dependence upon a timing element connected thereto; and timing element selector means for connecting a corresponding one of said plurality of timing elements to said timing circuit means in response to the operation of each of said selector elements.

15. A system as set forth in claim 7, wherein said converter means comprise first oscillator means furnishing an oscillator output signal for the duration of a timing signal applied thereto; timing circuit means furnishing said timing signal; and varying means interconnected between said selector elements and said timing circuit means for varying the duration of said timing signals to correspond to the selected one of said selector elements.

16. A system as set forth in claim 7, further comprising inhibitor means connected to said convertor means, for inhibiting the operation of said converter means for a predetermined time period following the furnishing of one of said input signals.

17. A system as set forth in claim 7, further comprising transducer means at said central station, said transducer means having an input connected to said communications network and a plurality of transducer outputs corresponding in number to said plurality of predetermined responses, for furnishing, in response to each of said response signals an output signal at the one of said transducer outputs corresponding to the burst length of said response signal.

18. Public opinion research system for polling a plurality of participants each having access to a communication system normally transmitting signals within a predetermined frequency band, comprising, in combination, a plurality of selectively operable input means, one for each of said participants, for furnishing, upon operation, an AC burst having a predetermined frequency outside of said predetermined frequency band and a burst length corresponding to said selected one of said plurality of predetermined responses; connecting means for connecting each of said input means to said communications network in such a manner that each of said input signals is transmitted to a central station of said communications network, thereby furnishing a corresponding plurality of response signals at said central station; transducer means at said central station, said transducer means having an input connected to said communications network and a plurality of transducer outputs corresponding in number to said plurality of predetermined responses, for furnishing, in response to each of said response signals, an output signal at the one of said transducer outputs corresponding to the burst length of said response signal, said transducer means comprising first transducer circuit means for changing each received one of said AC bursts to a corresponding pulse having a pulse width corresponding to said AC burst length, integrator means connected to said first transducer circuit means for furnishing an integrator signal having a peak amplitude corresponding to said pulse width, and a plurality of threshold circuit means each having an input connected to said integrator means and a threshold output, for furnishing a threshold output signal at said threshold output when the amplitude of said integrator signal is a corresponding predetermined amplitude, each of said threshold circuit means comprising flip-flop means having a SET input connected to said integrator means, a Y output for furnishing said threshold output signal and a $\overline{Y}$ output for furnishing a signal in the absence of said threshold output signal; and summing circuit means connected to said threshold circuit means for furnishing a plurality of output signals, each signifying the total number of participants selecting a given one of said predetermined responses.

19. A system as set forth in claim 17, wherein said transducer means are connected to a given telephone line; wherein said transducer means comprise a plurality of transducer means corresponding in number to the plurality of participants connected to said telephone line; further comprising a plurality of counter means corresponding in number to said plurality of predetermined responses, each for furnishing a counter output signal signifying the total number of participants connected to said telephone line who have selected a corresponding one of said predetermined responses.

20. A system as set forth in claim 19, further comprising scanning means interconnected between each of said counter means and the corresponding ones of said transducer outputs, for connecting each of said corresponding ones of said transducer outputs to said counter means in a predetermined sequence.

21. A system as set forth in claim 17, wherein said summing circuit means comprise a plurality of analog adder means, each having a plurality of analog adder inputs each connected to a corresponding transducer output, each of said analog adder means furnishing an analog adder output signal signifying the total number of response signals having a given burst length.

22. A system as set forth in claim 21, further comprising analog-digital converter means connected to the output of each of said analog adder means.

23. A system as set forth in claim 22, further comprising counter means connected to the outputs of said analog-digital converter means, for furnishing counter output signals corresponding to said analog adder output signals.

24. A system as set forth in claim 3, wherein a plurality of said private communication lines are connected to said computation station; further comprising means converting said counter output signals received on said communication lines and corresponding to a given one of said plurality of responses to pulse trains each having a number of pulses corresponding to the corresponding one of said counter output signals; shift register means receiving said pulses and furnishing corresponding shift register outputs; and full adder means for adding each of said shift register outputs to the sum of previously received shift register outputs thereby furnishing adder output signals signifying, following the addition of the last of said counter output signals, the total number of participants choosing a selected one of said plurality of responses.

25. A system as set forth in claim 12, further comprising computer circuit means at said central station, for receiving said input signals and said control signals and furnishing a computer output signal signifying the percentage of participants tuned to a given one of said television channels as a function thereof.

26. Public opinion research system for polling a plurality of participants each having access to a telephone network normally transmitting signals within a low frequency band comprising, in combination, a plurality of selectively operable input means, one for each of said participants, each for furnishing, upon operation, an input signal signifying a selected one of a plurality of predetermined responses, said input signal having a frequency higher than the frequencies in said low frequency band, each of said input means comprising a manually operable selector means having a plurality of selector elements and converter means responsive to the operation of any of said selector elements for furnishing a corresponding input signal, said converter means comprising burst furnishing means for furnishing an $A^c$ burst having the same predetermined frequency but a different predetermined burst length in response to operation of each of said selector elements, said burst furnishing means comprising first oscillator means for furnishing an oscillator output signal, AND-gate means having a first input connected to said oscillator means, a second input, and an output for furnishing said input signal in response to the simultaneous presence of signals at said first and second inputs, a plurality of timing elements, timing circuit means for furnishing timing pulses having a pulse width varying in dependence upon the timing element connected thereto, and timing element selector means for connecting a corresponding one of said plurality of timing elements to said timing circuit means in response to the operation of each of said selector elements, said timing element selector means comprising a plurality of relay means corresponding in number to said plurality of timing elements, each of said relay means having a relay coil energized in response to activation of the corresponding one of said selector elements, and a pair of relay contacts connecting the corresponding one of said timing elements to said timing circuit means upon energization of the corresponding relay coil; connecting means connecting each of said outputs of said AND-gate means to said communications network in such a manner that each of said input signals is transmitted to a central station of said communications network, thereby furnishing a corresponding plurality of response signals at said central station, said connecting means comprising filter means having a bandpass including the frequency of said input signals, and rejecting all other frequencies; and summing circuit means at said central station, for summing all response signals signifying each of said predetermined responses and furnishing a plurality of output signals, each signifying the total number of participants selecting a given one of said predetermined responses.

27. Public opinion research system for polling a plurality of participants each having access to a telephone network normally transmitting signals within a low frequency band comprising, in combination, a plurality of selectively operable input means, one for each of said participants, each for furnishing, upon operation, an input signal signifying a selected one of a plurality of predetermined responses, said input signal having a frequency higher than the frequencies in said low frequency band, each of said input means comprising a manually operable selector means having a plurality of selector elements and converter means responsive to the operation of any of said selector elements for furnishing a corresponding input signal, said converter means comprising burst furnishing means for furnishing an AC burst having the same predetermined frequency but a different predetermined burst length in response to operation of each of said selector elements, said burst furnishing means comprising oscillator means for furnishing an oscillator output signal for the duration of a timing signal applied thereto, timing circuit means for furnishing said timing signal, varying means interconnected between said selector elements and said timing circuit means for varying the duration of said timing signals to correspond to the selected one of said selector elements, and suppressor means connected to the output of said oscillator means for suppressing the initial portion of said oscillator output signal; connecting means for connecting each of said input means to said communications network in such a manner that each of said input signals is transmitted to a central station of said communications network thereby furnishing a corresponding plurality of response signals at said central station; and summing circuit means at said central station, for summing all response signals signifying each of said predetermined responses, and furnishing a plurality of output signals, each signifying the total number of participants selecting a given one of said predetermined responses.

28. Public opinion research system for polling a plurality of participants each having access to a communication system normally transmitting signals within a predetermined frequency band, comprising, in combination, a plurality of selectively operable input means, one for each of said participants, for furnishing, upon operation, an AC burst having a predetermined frequency outside of said predetermined frequency band and a burst length corresponding to said selected one of said plurality of predetermined responses; connecting means for connecting each of said input means to said communications network in such a manner that each of said input signals is transmitted to a central station of said communications network, thereby furnishing a corresponding plurality of response signals at said central station; transducer means at said central station, said transducer means having an input connected to said communications network and a plurality of transducer outputs corresponding in number to said plurality of predetermined responses, for furnishing, in response to each of said response signals, an output signal at the one of said transducer outputs corresponding to the burst length of said response signal, said transducer means comprising first transducer circuit means for changing each received one of said AC bursts to a corresponding pulse having a pulse width corresponding to said AC burst length, integrator means connected to said first transducer circuit means for furnishing an integrator signal having a peak amplitude corresponding to said pulse width, and a plurality of threshold circuit means each having an input connected to said integrator means and a threshold output, for furnishing a threshold output signal at said threshold output when the amplitude of said integrator signal is a corresponding predetermined amplitude; and summing circuit means connected to said threshold circuit means for furnishing a plurality of output signals, each signifying the total number of participants selecting a given one of said predetermined responses.

29. A system as set forth in claim 18, wherein said flip-flop means are arranged in a predetermined order corresponding to increasing AC burst length; further comprising a plurality of threshold AND-gates each having a first input connected to said $\overline{Y}$ output of a determined one of said flip-flops and a second input connected to said $y$ output of the next subsequent one of said flip-flops in said predetermined order.

* * * * *